US011849353B2

(12) United States Patent
Neipris et al.

(10) Patent No.: US 11,849,353 B2
(45) Date of Patent: Dec. 19, 2023

(54) BRIDGE SYSTEM FOR CONNECTING A PRIVATE COMPUTER NETWORK TO A PUBLIC COMPUTER NETWORK

(71) Applicant: 5321 Innovation Labs LLC, Foxboro, MA (US)

(72) Inventors: Edward William Neipris, Wrentham, MA (US); David Rueben Doiron, Franklin, MA (US)

(73) Assignee: 5321 INNOVATION LABS LLC, Foxboro, MA (US)

( * ) Notice: Subject to any disclaimer, the term of this patent is extended or adjusted under 35 U.S.C. 154(b) by 27 days.

(21) Appl. No.: 17/350,068

(22) Filed: Jun. 17, 2021

(65) Prior Publication Data

US 2021/0400534 A1     Dec. 23, 2021

Related U.S. Application Data

(60) Provisional application No. 63/040,723, filed on Jun. 18, 2020.

(51) Int. Cl.
*H04W 28/086* (2023.01)
*H04W 28/16* (2009.01)
(Continued)

(52) U.S. Cl.
CPC ......... *H04W 28/0866* (2023.05); *H04L 12/66* (2013.01); *H04W 28/0236* (2013.01);
(Continued)

(58) Field of Classification Search
CPC ......... H04W 28/0823; H04W 28/0236; H04W 28/0247; H04W 28/16; H04W 40/02;
(Continued)

(56) References Cited

U.S. PATENT DOCUMENTS 8,577,403 B2 * 11/2013 Shoemake ............ H04W 92/02
                                                         455/67.11
2008/0033845 A1 * 2/2008 McBride .................. G09B 5/00
                                                         705/28

(Continued)

*Primary Examiner* — Omer S Mian
(74) *Attorney, Agent, or Firm* — KRIEGSMAN & KRIEGSMAN

(57) ABSTRACT

A bridge system establishes a network connection between each of a plurality of private computer networks and a public computer network. The bridge system includes a plurality of bridge devices, each bridge device being connected to the public computer network. Additionally, the bridge system includes a central controller in connection with each bridge device. The central controller configures each bridge device for wireless communication with a designated private network, with aspects of the bridge device configuration being reviewable and modifiable through a network interface in communication with the central controller. Accordingly, the bridge system creates a private-to-public network link between each private network and the public network. As a result, an internet-enabled device with access to the network link is afforded with all the network services and resources provided by the private network over the substantially broadened geographic area of coverage delivered by the public network.

15 Claims, 5 Drawing Sheets

(51) Int. Cl.
*H04L 12/66* (2006.01)
*H04W 28/02* (2009.01)
*H04W 40/02* (2009.01)

(52) U.S. Cl.
CPC ....... *H04W 28/0247* (2013.01); *H04W 28/16* (2013.01); *H04W 40/02* (2013.01)

(58) Field of Classification Search
CPC ..... H04L 12/66; H04L 45/42; H04L 12/4625; H04L 2012/5618
See application file for complete search history.

(56) References Cited

U.S. PATENT DOCUMENTS

| | | | |
|---|---|---|---|
| 2016/0164831 A1* | 6/2016 | Kim | H04L 43/08 709/223 |
| 2017/0250945 A1* | 8/2017 | Wadhwa | H04L 45/66 |
| 2018/0034821 A1* | 2/2018 | Basetty | H04L 63/101 |

* cited by examiner

BRIDGE SYSTEM FOR CONNECTING A PRIVATE COMPUTER NETWORK TO A PUBLIC COMPUTER NETWORK

CROSS-REFERENCE TO RELATED APPLICATIONS

The present application claims the benefit under 35 U.S.C. 119(e) to U.S. Provisional Patent Application No. 63/040,723, which was filed on Jun. 18, 2021 in the names of Edward William Neipris et al., the disclosure of which is incorporated herein by reference.

FIELD OF THE INVENTION

The present invention relates generally to computer networks and, more particularly, to network environments which include both private and public computer networks.

BACKGROUND OF THE INVENTION

Due to the required use of compute devices in wide variety of daily activities, various types of computer networks are typically established to facilitate access to services (e.g., Internet access) and resources (e.g., printing, casting, and file sharing). Certain environments (e.g., apartment buildings, office complexes, and universities) often contain a multitude of independent computer networks, with portable compute devices often connecting to a selection of the networks based on its location and relative proximity thereto.

A private computer network is a typically designed as a trusted network which provides internet access and local area networking functions to authorized users within a designated range, such within an individual apartment or office. A simplified schematic representation of an illustrative private network is shown in FIG. 1, the private network being identified generally by reference numeral 11.

As can be seen, private network 11 comprises a network device 13 (e.g., a router) which establishes a connection to the Internet as part of a retail offering from a designated Internet Service Provider (ISP). As part of the private network construction process, the ISP designates a unique network name (e.g., a Service Set Identifier (SSID)) and passphrase in order to restrict network access to authorized devices and peripherals. In this manner, various types of network-enabled devices 15 (e.g., a network printer 15-1, laptop computer 15-2, and smartphone 15-3) are able to connect to network device 13 and together form a managed local area network (LAN) 17 with services and resources that are optimized for the designated user(s). The creation of managed LAN 17 enables devices 15 to communicate with one another (e.g., enabling computer 15-2 to send a print job to printer 15-1 through the LAN).

In the present example, network device 13 is represented as a wireless router, which is only able to provide access to authorized devices that are located within a designated physical range (e.g., within 150 feet). In most residential and office settings, the limited geographic range afforded by a conventional private network is largely sufficient. However, due to the ubiquitous use of compute devices and increasing reliance of network services outside of traditional settings, the limited geographic range afforded by private networks has become increasingly problematic.

Accordingly, the establishment of public computer networks has grown considerably in order to provide access to the Internet to the general public. A simplified schematic representation of an illustrative public network is shown in FIG. 2, the public network being identified generally by reference numeral 31.

As can be seen, public network 31 is similar to private network 11 in that public network 31 comprises a network device 33 (e.g., switch-type internet equipment) which establishes a connection to the Internet as part of a bulk offering through a selected ISP. In the present example, public network 31 includes a plurality of wireless access points (WAPs) 35-1 thru 35-4, each of which is connected to network device 33 via an ethernet cable. Each WAP 35 provides wireless access to network device 33 and, as a result, to the Internet.

Public network 31 differs from private network 11 in that access is largely unrestricted and may not require a passphrase or other similar verification process. As a result, various types of network-enabled devices 37 (e.g., a network printer 37-1, laptop computer 37-2, and smartphone 37-3), which may be owned by many different people and groups, are able to wirelessly connect to the same network device 33 via WAPs 35 and thereby obtain access to the Internet.

Through broad dispersion of WAPs 35 throughout a particular area (e.g., within an office park, apartment complex or university), public network 31 is able to provide expanded geographic coverage, which is highly desirable. Because public network 31 provides internet access to a large number of different users, a firewall 39 is typically established by the ISP to protect network device 33, and any device 37 connected thereto, from potentially malicious network traffic.

The managing entity of a public network 31 may establish an onboarding system for public users seeking internet access through network 31. For example, a public network established by the owner of an apartment complex may provide an onboarding system for individual residents who are seeking public internet access (e.g., in a common area). In this situation, each resident is assigned a Virtual Local Area Network (VLAN) through public network 31 which, in turn, can be used to create a Personal Area Network (PAN) 41. By establishing a PAN through public network 31, multiple devices within the same PAN are able to communicate with a certain degree of security.

Certain environments (e.g., apartment buildings, office complexes, and universities) often contain a multitude of independent private networks of limited range as well as one or more public networks of expanded, or campus-wide, coverage. As such, in order to maintain internet access, a user device is typically designed to rely primarily upon authorized private networks 11 when within range, but transition to broader public networks 31 when out of range from authorized private networks 11. Although well known in the art, the above-described network environment design has been found to suffer from a couple notable shortcomings.

As a first shortcoming, the rules implemented for switching amongst private and public networks are often poorly executed. As a result, frequent transition between private and public networks is common and often results in a temporary interruption of service, which can have significant implications in certain applications.

As a second shortcoming, the transition from a private network to a public network often significantly limits the degree of functionality afforded to the user. In particular, a user with authorized access to a private network is often afforded certain user-defined parameters of the service afforded by its ISP (e.g., access speeds and port forwarding) as well as network resources (e.g., file sharing and available peripherals). By comparison, when the user device transitions to a public network, the services afforded by the public network ISP are typically limited in scope (i.e., as defined by the public network provider). Additionally, private network resources (e.g., file sharing), which were previously available to the user device, are often rendered inaccessible or less secure when issued through a public network.

SUMMARY OF THE INVENTION

In view thereof, it is an object of the present invention to provide a bridge system for connecting a private computer network to a public computer network.

It is another object of the present invention to provide a bridge system as described above which transitions between private and public computer networks without interruption of service.

It is yet another object of the present invention to provide a bridge system as described above which maintains availability of the most optimal network services and resources for the user.

It is still another object of the present invention to provide a bridge system as described above which is readily scalable and inexpensive to implement.

Accordingly, as one feature of the present invention, there is provided a network bridge system for establishing a network connection between a plurality of private computer networks and a public computer network, each of the private computer networks having a defined set of network services and resources, the network bridge system comprising (a) a first bridge device in communication with the public computer network, and (b) a central controller in communication with the first bridge device, the central controller assigning the first bridge device to a first of the plurality of private computer networks, the central controller configuring the first bridge device to establish a communication link between the first bridge device and the first of the plurality of private computer networks, (c) wherein the first bridge device establishes a private-to-public network link between the first of the plurality of private computer networks and the public computer network, the first bridge device being configured to transmit data on the private-to-public network link based on the defined set of network services and resources associated with the first of the plurality of private computer networks.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

Bn the drawings, wherein like reference numerals represent like parts.

DETAILED DESCRIPTION OF THE INVENTION

Bridge System 111

Figure 3:
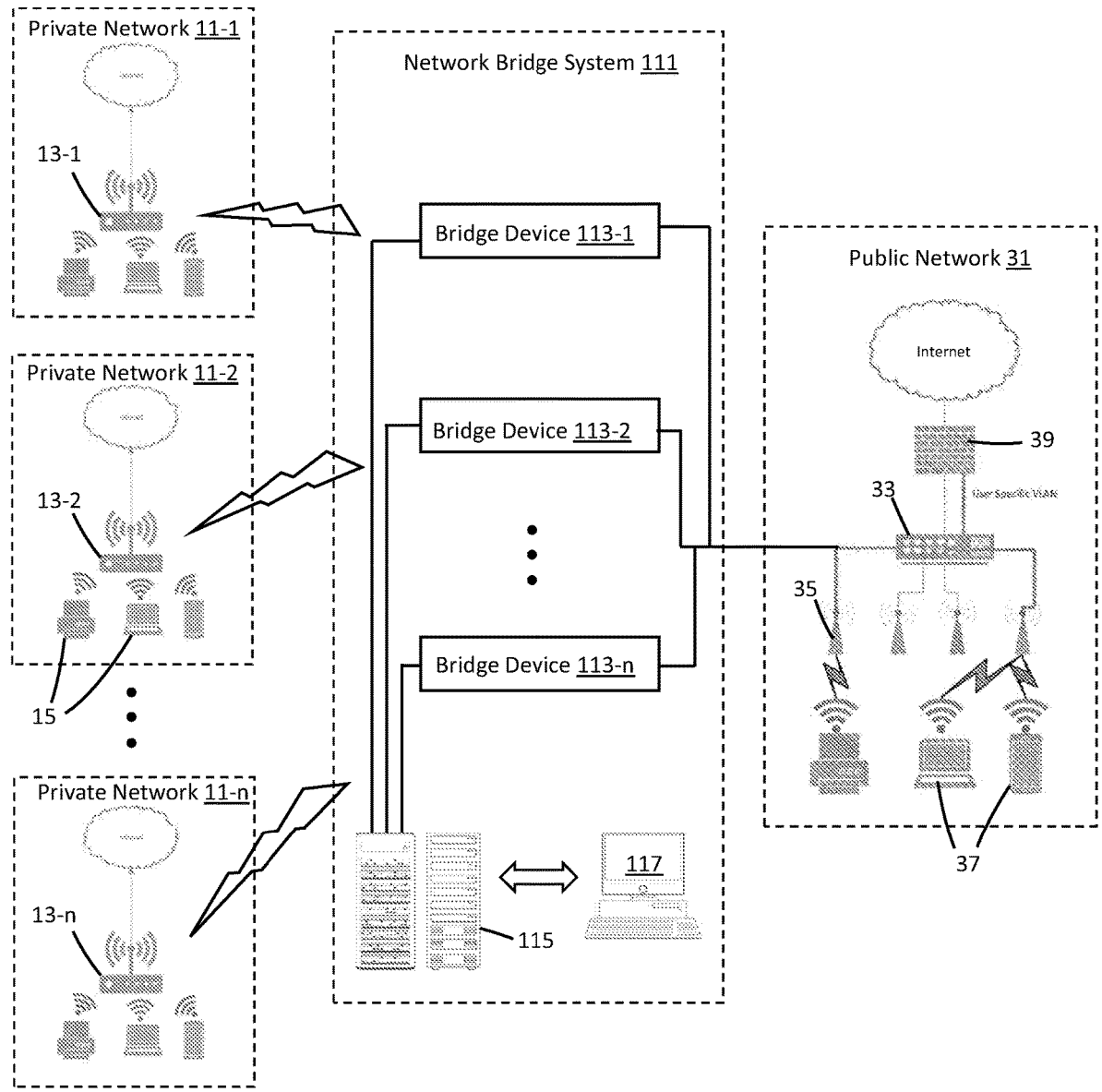
FIG. 3 is a simplified schematic representation of a bridge system implemented according to the teachings of the present invention, the bridge system being shown connecting a plurality of private computer networks to a common public computer network.

Referring now to FIG. 3, there is shown a simplified schematic representation of a network bridge system constructed according to the teachings of the present invention, the network bridge system being identified generally by reference numeral 111. As will be explained further in detail below, network bridge system 111 is uniquely designed to establish a connection, or bridge, between a private computer network and a public computer network. In this manner, an internet-enabled compute device is able to maintain access to the most optimal network services and resources afforded by a private computer network over a substantially widened, or expanded, geographic area of coverage using standards-based network communications protocols and common data storage techniques.

In the present example, network bridge system, or bridge system, 111 is shown connecting a plurality of independent private computer networks 11-1 thru 11-n to a common public computer network 31. Configured in this fashion, system 111 has particular usefulness in certain environments where a plurality of independent private computer networks, each with limited range, exist within the broader geographic coverage afforded by a public computer network. Examples illustrative of such environments include, inter alia, apartment buildings, office complexes, and college campuses.

Figure 1:
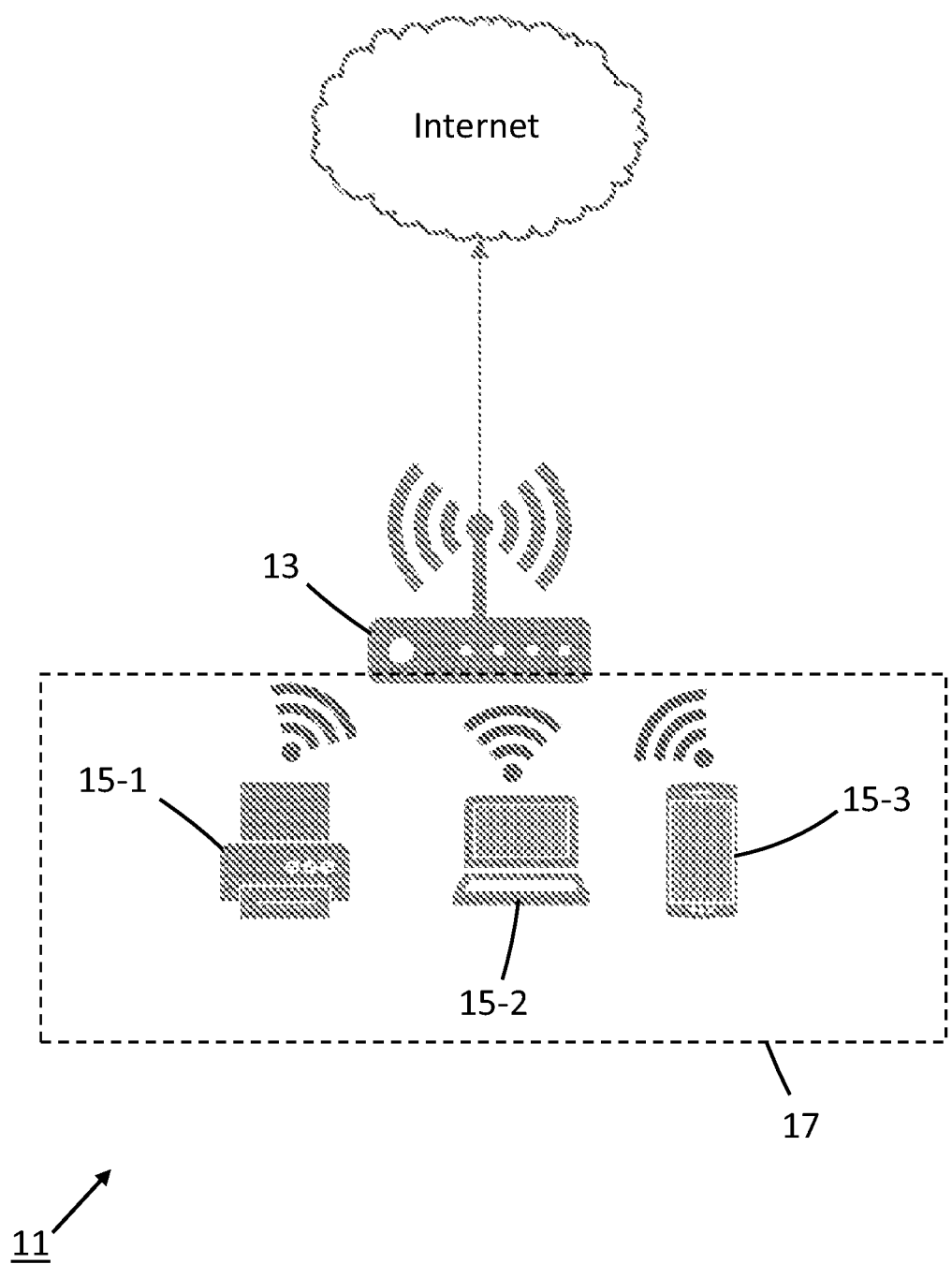
FIG. 1 is a simplified schematic representation of an illustrative private network which is well known in the art.

Each of private computer networks 11-1 thru 11-n is represented as the conventional private computer network 11 shown in FIG. 1. Accordingly, each private computer network 11 comprises a network device 13 (e.g., a router) which establishes a connection to the Internet as part of a retail offering from a designated Internet Service Provider (ISP). In this manner, various types of network-enabled devices 15 are able connect to a common network device 13 and together form a managed local area network (LAN), with services and resources that are optimized for the designated user(s). The creation of the managed LAN enables devices 15 to communicate directly with one another (e.g., enabling a computer to send a print job to a printer which is part of the same LAN).

Each private network 11 represents any trusted computer network which provides internet access and local area network functions to authorized users (e.g., users providing a designate passcode) within a designated range. It should be noted that the particular number and specific details of private computer networks 11 are for illustrative purposes only and could be modified without departing from the spirit of the present invention.

Figure 2:
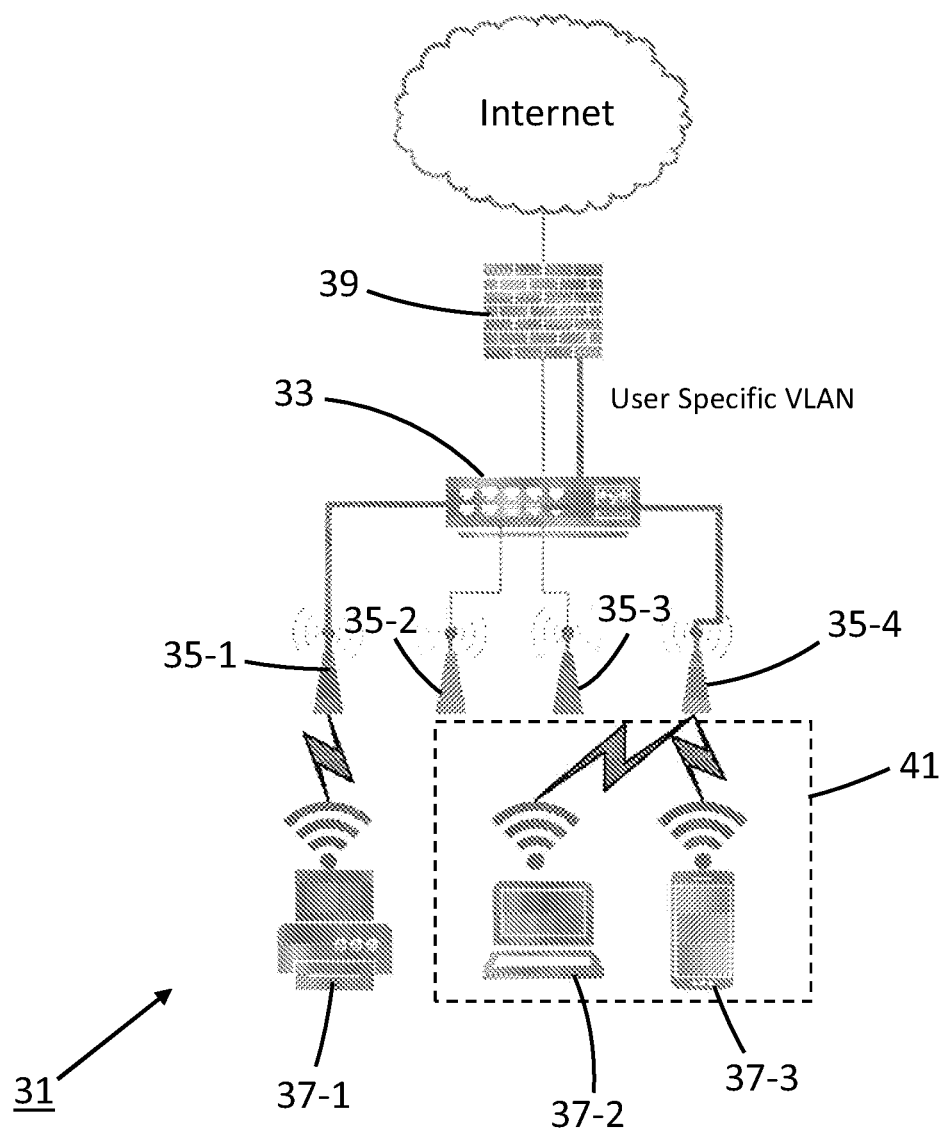
FIG. 2 is a simplified schematic representation of an illustrative public network which is well known in the art.

Similarly, public computer network 31 is represented as the conventional public computer network 31 shown in FIG. 2. Accordingly, public computer network 31 comprises a network device 33 (e.g., switch-type internet equipment)

which establishes a connection to the Internet as part of a bulk offering through a selected ISP. Additionally, public network 31 includes a plurality of wireless access points (WAPs) 35, each of which is connected to network device 33 via an ethernet cable. As a result, various types of network-enabled devices 37 (e.g., a network printer, laptop computer, and smartphone), which may be owned by many different people and groups, are able to wirelessly connect to the same network device 33 via WAPs 35 and thereby obtain access to the Internet. Through broad dispersion of WAPs 35 throughout a particular area (e.g., within an office park, apartment complex or university), public network 31 is able to provide expanded geographic coverage.

Public network 31 represents any largely unrestricted computer network which provides network services and resources, often of limited functionality and/or performance, to the general public. Because public network 31 provides internet access to a large number of different users, a firewall 39 is preferably utilized by the ISP to protect network device 33, and any device 37 connected thereto, from potentially malicious network traffic. However, it should be noted that particular number and specific details of public computer network 31 are for illustrative purposes only and could be modified without departing from the spirit of the present invention. Notably, additional public computer networks 31 may be integrated into the aggregate network to further expand geographic coverage and/or handle increased data volume levels.

As seen in FIG. 3, bridge system comprises (i) a plurality of bridge devices 113-1 thru 113-n, each bridge device 113 establishing a connection between a designated private network 11 and public computer network 31, (ii) a central controller 115 for, among other things, configuring the connection properties for each bridge device 113 (e.g., selecting a designated private network 11 to connect to public network 31), and (iii) a software-implemented network interface 117 in communication with central controller 115 for providing a user interface to, inter alia, regulate network bridging properties and monitor performance.

Each bridge device 113 is designed to create a physical bridge between a designated private network 11 and public network 31 in a secure fashion. Preferably, each bridge device 113 is strategically placed or installed in close proximity to its designated private network 11 to ensure that an adequate wireless communication path can be maintained. In this manner, an internet-enabled compute device (e.g., a smartphone) is able to maintain access to the user-optimized network services and resources afforded by its designated private computer network 11 over the expanded geographic area provided by the public computer network 31.

As referenced above, each bridge device 113 is designated for use with a corresponding private network 11. Accordingly, the specific number of bridging devices 113 utilized in a particular application is dependent upon the number of private networks 11 in the network environment. Therefore, it can be appreciated that network bridging system 111 is readily scalable by simply incorporating additional bridge devices 113.

Figure 4:
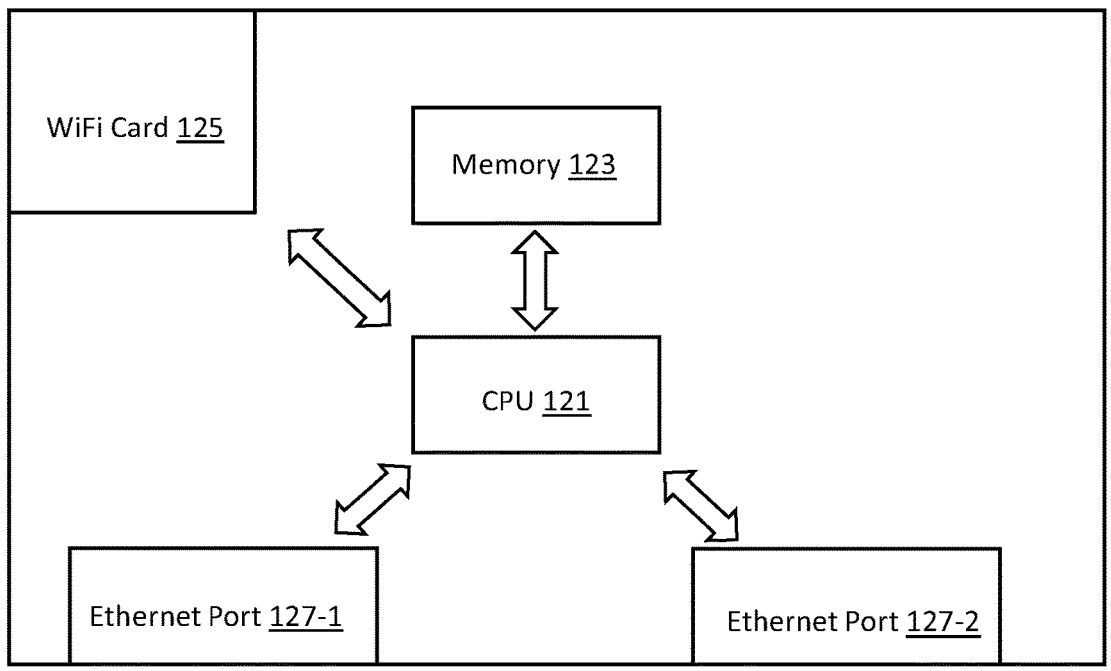
FIG. 4 is a simplified electrical schematic representation of one of the bridge devices shown in FIG. 3.

Each bridge device 113 is in the form of specialized hardware that is designed to perform a physical bridging between a designated private computer network 11 and public computer network 31. As seen in FIG. 4, bridge device 113 is a modular network component which preferably includes (i) a central processing unit, or CPU, 121 for controlling the principal operations of device 113, (ii) memory 123 in communication with CPU 121 for storing data used in connection with performing the principal operations of bridge device 113, (iii) a Wi-Fi certified wireless network interface card 125 in communication with CPU 121 for establishing wireless connection with the network device 13 in its designated private network 11, (iv) a first ethernet port 127-1 for establishing direct physical connection to network device 33 in public network 31 (e.g., via ethernet cable) as well as for adding and removing VLAN information to any data transmitted or received, and (v) a second ethernet port 127-2 for establishing direct physical connection to central controller 115 (e.g., via ethernet cable).

In the present embodiment, each bridge device 113 is configured to wirelessly communicate with a designated private network 11 via wireless network interface card 125, as will be explained further in detail below. However, although not shown herein, it should be noted that each bridge device 113 could be alternatively constructed with multiple (e.g., 4-6) wireless network interface cards 125, each of which is connected to CPU 121. By configuring each network interface card 125 to communicate with a corresponding private network 11, it is to be understood that a single bridge device 113 could be designed to independently bridge multiple private networks 11 to a public network 31 in a secure fashion.

Central controller 115 represents any local or cloud-based compute device that can be programmed with application-specific software to, inter alia, (i) manage the configuration and maintenance of the individual network bridge devices 113 established between private networks 11 and public network 31, (ii) monitor the performance of the individual network bridge devices 113 to ensure proper operation, (iii) implement the software-defined network features that are needed to ensure user data is traversing properly between networks (e.g., interrupting the delivery of data from a VLAN in public network 31 to its designated private network 11), and (iv) storing data locally and/or remotely using standard data storage techniques, the stored data relating to, for example, the connection state of bridge devices 113. Any additional features may be integrated in bridge system 111 via central controller 115, as needed.

Network interface 117 represents any computer-based user interface, implemented through application-specific computer software, which enables a user to create, modify and/or delete a designated bridge device 113 based on a predefined set of user restrictions. Additionally, network interface 117 may provide statistics and details to high-level, administrative-type, users about the operation of all bridge devices 113 as well as network bridge system 111. The interface mechanism for network interface 117 can be in any suitable form including, but not limited to, a designated webpage, downloadable software application, or application programming interface (API). Accordingly, through network interface 117, a network customers can bridge their private networks 11 with public network 31 and regulate certain properties of the resultant network.

Network Bridging Process

Figure 5:
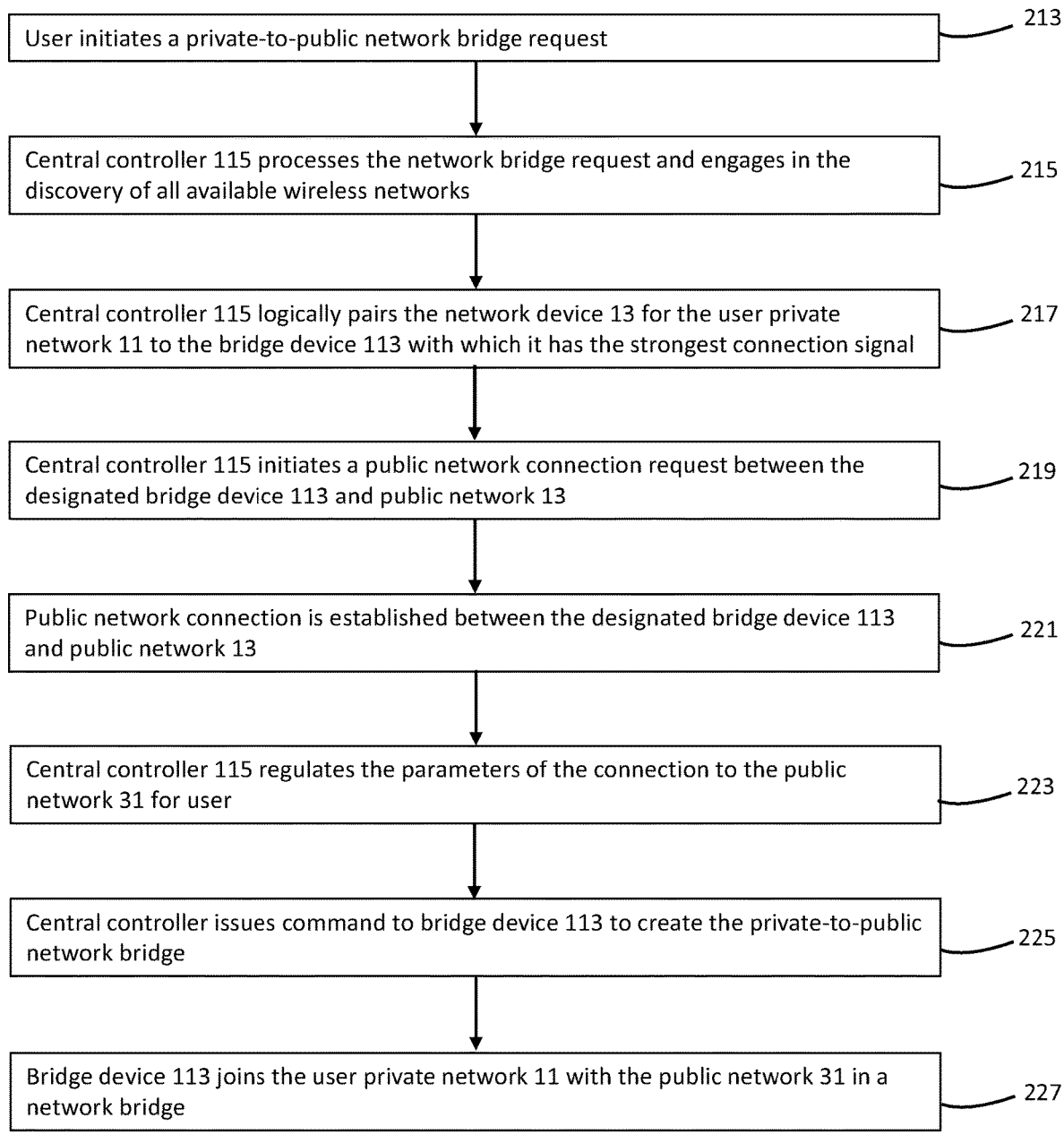
FIG. 5 is a flow chart illustrating the process in which the bridge system creates a connection between one of the private computer networks to the common public network through a designated bridge device.

Referring now to FIGS. 3 and 5, there is shown a novel process for establishing a physical connection, or network bridge, between one of the private computer networks 11 and common public network 31 using network bridging system 111, the network bridging process being identified generally by reference numeral 211. As referenced previously, bridging a private computer network 11 with a public network 31 enables a user device to maintain access to the most optimal network services and resources afforded by a private computer network over a substantially widened, or expanded, geographic area of coverage.

As the first step in network bridging process 211, a user initiates a private-to-public network bridge request via network interface 117, this bridge initiation request being identified generally by reference numeral 213 in FIG. 5. Specifically, the user electronically accesses network interface 117 and provides the necessary credentials (i.e., the SSID and passphrase) for the specific private network 11 assigned to the user.

For enhanced security, the private network credentials are preferably maintained in an encrypted format in the data storage device for network bridge system 111 (e.g., either locally in or remotely from central controller 115). Furthermore, the private network credentials are only decrypted when used to initialize or maintain a wireless link between bridge system 111 and the user private network 11.

If the user additionally has a previously established VLAN with public network 31, the credentials associated with the VLAN should similarly be included in bridge initiation step 213 in order to achieve optimal user functionality. If network interface 117 and central controller 115 have been integrated into the onboarding system for the vendor, or provider, of public network 31, the public network connection details for the user (e.g., VLAN information and access restrictions) can be automatically gathered by central controller 115 for subsequent use. Alternatively, if network interface 117 and central controller 115 have not been integrated into the onboarding system for the vendor, the user may be required to provide the public network connection details via web interface 117.

Upon completion of bridge initiation step 213, central controller 115 processes the bridge request and engages in a wireless network discovery step to help locate the user private network 11, the discovery step being represented generally by reference numeral 215. As part of discovery step 215, central controller 115 instructs all logically connected bridge devices 113 to perform a discovery of available wireless networks. In response, each bridge device 113 reports back to central controller 115 all detected wireless networks within connectivity range.

Central controller 115 in turn removes, or filters out, any detected wireless networks with an SSID that is different from the private network SSID provided by the user in step 213. Since more than one private network 11 may utilize the same SSID name (e.g., home network), controller 115 will instruct each bridge device 113 to perform a test connection using the provided passphrase in order to obtain the unique basic service set identifier (BSSID) for the private network 11. Once the BSSID is obtained, central controller 115 instructs all bridge devices 113 to terminate test connection to the private network 11. Thereafter, central controller 115 requests all bridge devices 113 with visibility to the user provided SSID having the previously obtained BSSID to perform a wireless signal quality check.

Based on the signal quality results, central controller 15 logically pairs the bridge device 113 with the strongest connection signal to the private network SSID as part of a network pairing step 217. As a result, a long-term connection request is initiated between the designated bridge device 113 and the network device 13 for the user private network 11. The wireless connection established between the designated bridge device 113 and the network device 13 for the user private network 11 is preferably implemented using standard Wi-Fi connection techniques and standards, such as Wireless Distribution System (WDS) or proxy Address Resolution Protocol (ARP) if the network hardware is incapable of WDS.

Once the wireless link is established between the designated bridge device 113 and the network device 13 for the user private network 11, central controller 115 initiates a public network connection request between the designated bridge device 113 and public network 31, the public connection request being identified generally as step 219. In turn, a public network connection is established between the designated bridge device 113 and public network 31 via ethernet connection, as represented by step 221. As previously referenced, if the user has a pre-established VLAN with public network 31, the VLAN information is preferably provided either directly by the user (via network interface 117) or through automated extraction from a common onboarding system. To ensure the public connection link has been established properly in step 221, test data is preferably (i) sent between the designated bridge device 113 and public network 31, and (ii) verified by central controller 115.

With private and public links established with the designated bridge device 113, central controller 115 regulates the parameters of the connection to the public network 31. Thereafter, as part of step 223, central controller 115 issues commands to the network infrastructure for the public network 31 to, inter alia, (i) disconnect any network pathways on which data should not travel, and (ii) disable any services that are inferior to the services provided by the private network 11. As an example, it is preferred that the network equipment 13 associated with private network 11 provide the principal network services, such as network management protocols and Internet routing, since private network 11 is typically optimized and user-driven based on predefined conditions. To ensure that certain network services are provided solely by private network 11, central controller 115 instructs the network equipment 33 in public network 31 to disable such services.

With public network 31 properly configured so as to not impinge on the private network services, central controller 115 issues a final command to bridge device 113 to create the private-to-public network bridge, the bridge command being identified generally by reference numeral 225. In response, bridge device 113 joins the wireless private and wired public network links in a software or logical bridge as part of a final step 227. Accordingly, data traffic transmitted from the private network 11 will be (i) accepted through the wireless private network connection, (ii) added with any VLAN information, and (iii) sent through the wired public network connection. Conversely, data traffic transmitted from the public network 31 will be (i) accepted through the wired public network connection using the VLAN associated with the user and network bridge 113, (ii) removed of any VLAN information from the data packet, and (iii) sent through the wireless private network connection.

Having established a network bridge in step 227, any user compute device connected to either (i) a private network 11 (e.g., using the private network SSID and passphrase) or (ii) the public network 31 (e.g., using the credentials provided by onboarding system for the managed network vendor) is serviced by, and routed to, the services and equipment for private network 11. In this manner, the compute device is able to maintain access to the most optimal network services and resources afforded by a private computer network over a substantially widened, or expanded, geographic area of coverage.

Features and Advantages of Bridge System 111

The novel design and functionality of network bridge system 111 allows for the creation of an aggregated, or linked, private-to-public computer network with a number of distinct features and advantages over conventional computer networks.

As a first feature, a linked private-to-public computer network created by bridge system 111 serves to significantly expand available network coverage. Notably, the inclusion and broadly dispersed positioning of WAPs 35 affords public network 31 and, as a consequence, the aggregated private-to-public computer network with substantially broad network range. Due to the portable nature and ubiquitous use of various types of compute devices, the ability to obtain broad and reliable network coverage is highly advantageous.

As a second feature, a linked private-to-public computer network created by bridge system 111 is user driven. In other words, the aggregated private-to-public computer network yields the user-optimized set of network services and resources that are afforded by the private computer network 11.

As a third feature, a linked private-to-public computer network created by bridge system 111 is highly secure. Private network security information is added to transmitted data packets to ensure that all transmitted data remains secure.

As a fourth feature, a linked private-to-public computer network created by bridge system 111 is highly scalable. Notably, the number of private networks 11 to be linked with public network 31 can be increased by adding a commensurate number of bridge devices 113 and, in turn, connecting each added bridge device 113 to central controller 115. In this capacity, the aggregated network can be reconfigured, as needed, to meet the particular demands of the intended application.

Alternatively, as previously proposed, a single bridge device 113 could be equipped with multiple wireless network interface cards 125, with each network interface card 125 configured to communicate with a corresponding private network 11. Accordingly, rather than scaling network bridge system 111 using a one-to-one correspondence between each bridge device 113 and a corresponding private network 11, greater scalability can be readily achieved by simply designing each bridge device 113 to communicate with a larger number of private networks 11.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A network bridge system for establishing a network connection between a plurality of private computer networks and a public computer network, each of the public and private computer networks having a defined set of network services and resources, the network bridge system comprising:
 (a) a first bridge device in communication with the public computer network; and
 (b) a central controller in communication with the first bridge device, the central controller assigning the first bridge device to a first of the plurality of private computer networks based on a signal strength of a wireless communication path between the first bridge device and the first of the plurality of private computer networks, the central controller configuring the first bridge device to establish a communication link between the first bridge device and the first of the plurality of private computer networks;
 (c) wherein the first bridge device establishes a private-to-public network link between the first of the plurality of private computer networks and the public computer network, the first bridge device being configured to transmit data on the private-to-public network link based on the defined set of network services and resources associated with the first of the plurality of private computer networks;
 (d) wherein the central controller regulates a set of connection parameters to the public network that is applied to the private-to-public network link, the set of connection parameters applying selective restrictions to the set of network services and resources on the public network via the private-to-public network link, the restrictions disable some network services among the set of network services in order to be solely provided by the private network.

2. The network bridge system as claimed in claim 1 wherein the first bridge device is separate from each of the plurality of private computer networks and the public computer network.

3. The network bridge system as claimed in claim 2 wherein the first bridge device comprises:
 (a) a central processing unit for regulating operation of the first bridge device; and
 (b) a wireless network interface card in communication with the central processing unit;
 (c) wherein the wireless network interface card is configured to establish the wireless communication path with the first of the plurality of private computer networks.

4. The network bridge system as claimed in claim 3 wherein the central controller restricts wireless communication from the wireless network interface card for the first bridge device to the first of the plurality of private computer networks.

5. The network bridge system as claimed in claim 4 wherein the first bridge device comprises a first ethernet port for establishing a direct physical connection path between the first bridge device and the public computer network.

6. The network bridge system as claimed in claim 5 wherein the first bridge device comprises a second ethernet port for establishing a direct physical connection path between the first bridge device and the central controller.

7. The network bridge system as claimed in claim 4 wherein the central controller configures the public network to restrict pathways through which data is transmitted on the private-to-public network link.

8. The network bridge system as claimed in claim 7 wherein the central controller disables a selection of services provided by the public network.

9. The network bridge system as claimed in claim 8 wherein the central controller is adapted to provide network bridging properties and performance data via a network interface.

10. The network bridge system as claimed in claim 9 wherein the network bridge system stores a set of private network credentials for the first of the plurality of private networks.

11. The network bridge system as claimed in claim 10 wherein the network bridge system stores the set of private network credentials for the first of the plurality of private networks in an encrypted format.

12. The network bridge system as claimed in claim 4 wherein the network bridge system comprises a second bridge device in communication with the public computer network and the central controller.

13. The network bridge system as claimed in claim 12 wherein the central controller configures the second bridge device to establish a communication link between the second bridge device and a second of the plurality of private computer networks.

14. The network bridge system as claimed in claim 13 wherein the second bridge device establishes a private-to-public network link between the second of the plurality of private computer networks and the public computer network, the second bridge device being configured to transmit data on the private-to-public network link based on the defined set of network services and resources associated with the second of the plurality of private computer networks.

15. The network bridge system as claimed in claim 14 wherein the private-to-public network link between the first bridge device and the public computer network is independent from the private-to-public network link between the second bridge device and the public computer network.

* * * * *